United States Patent Office 3,548,563
Patented Dec. 22, 1970

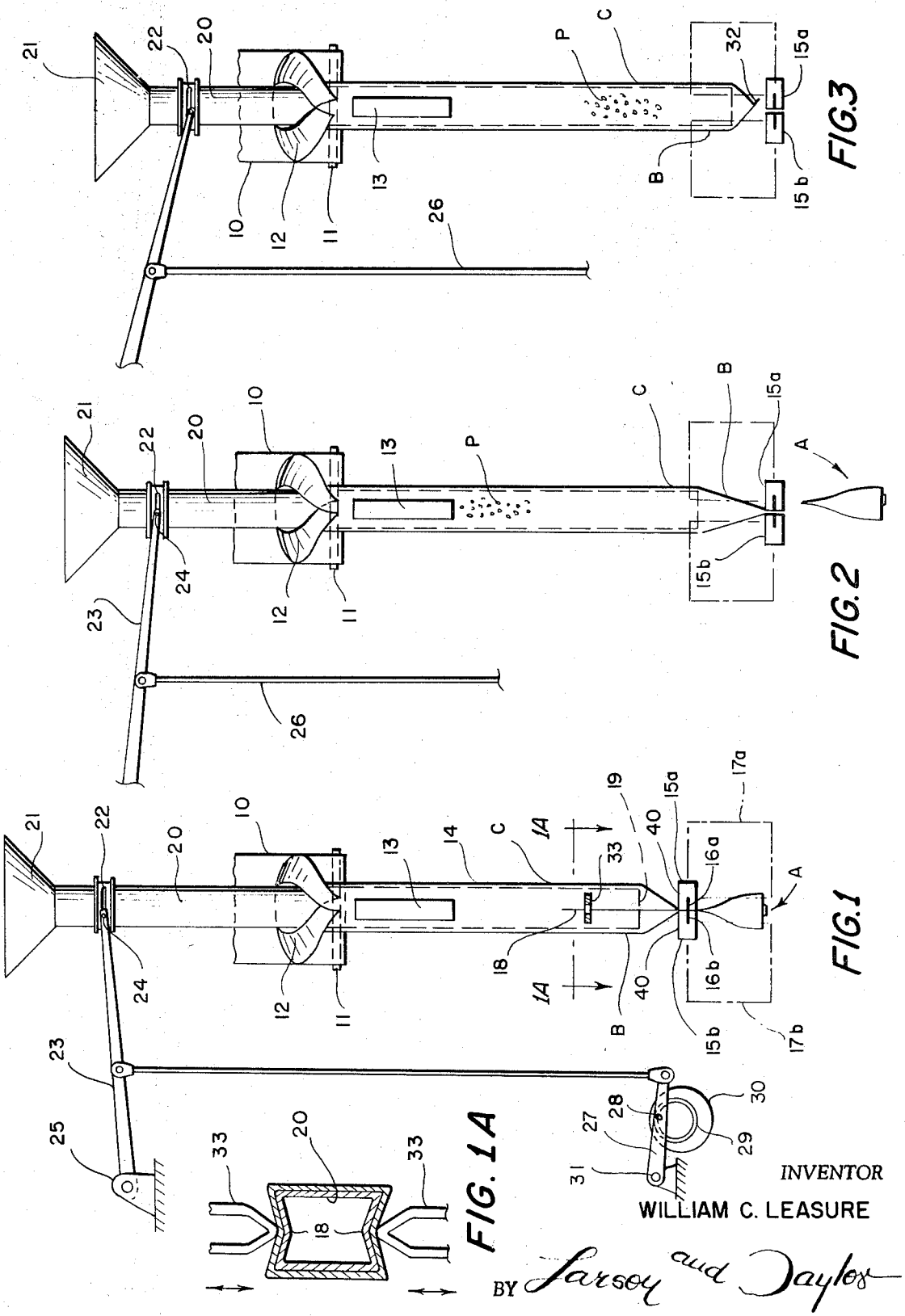

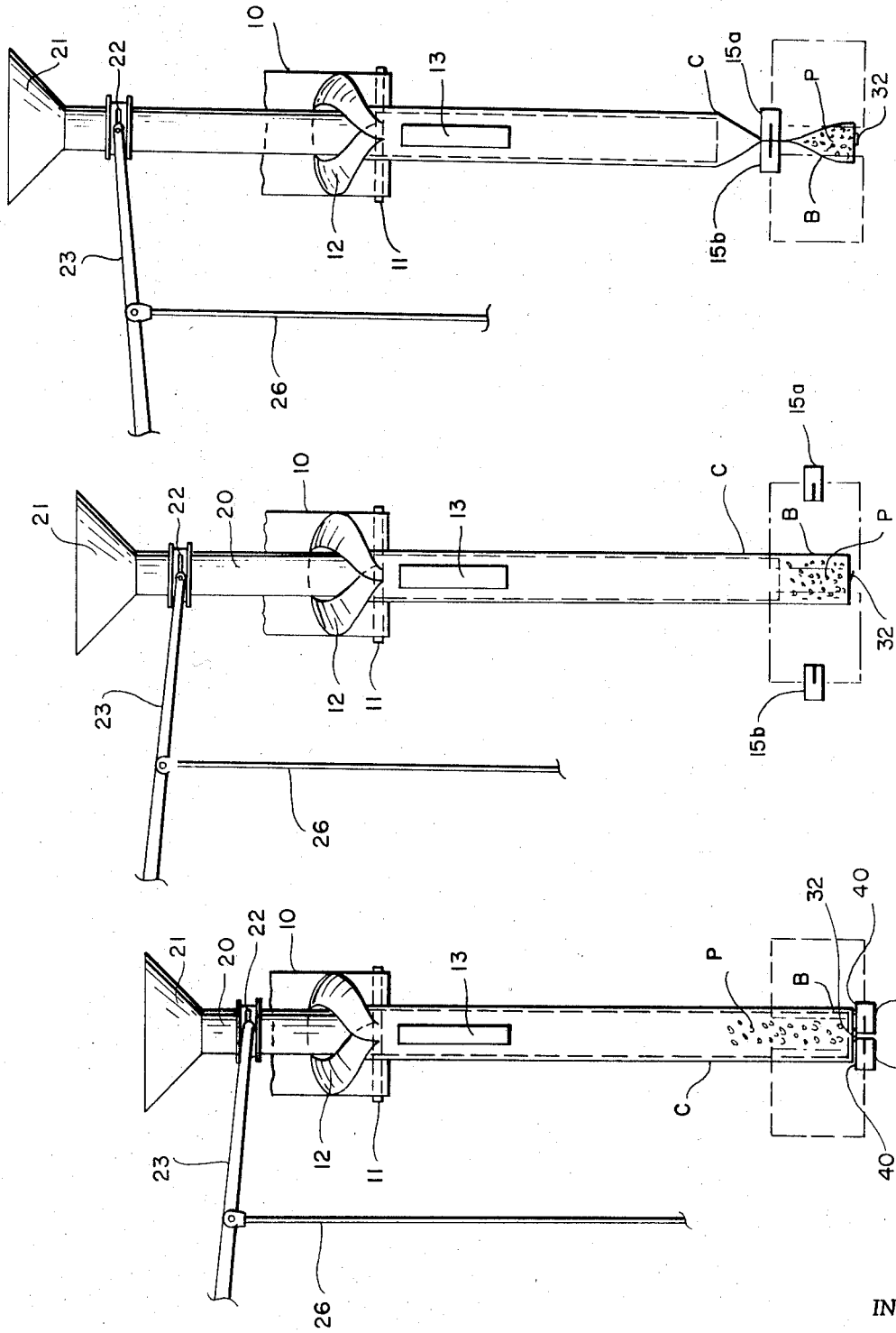

3,548,563
METHOD AND APPARATUS FOR PACKAGING WITH A MOVABLE MANDREL AND PLATEN TOP SEALING JAWS
William C. Leasure, Houston, Tex., assignor to Mira-Pak, Houston, Tex.
Filed Aug. 12, 1968, Ser. No. 752,031
Int. Cl. B65b 9/08, 51/32
U.S. Cl. 53—28                                14 Claims

ABSTRACT OF THE DISCLOSURE

A method and an apparatus for packaging including a former for forming a tubular length of material, sealing jaws for forming a transverse seal on the length of material and a mandrel movable within the tubular length of material. The mandrel cooperates with the top of the sealing jaws to flatten the bottom end of the tubular length of material.

BACKGROUND—FIELD OF THE INVENTION

This invention relates to packaging and in particular it relates to a method and apparatus wherein a movable mandrel cooperates with the sealing jaws in the production of a flat bottom package on form, fill and seal type packaging machinery.

BACKGROUND—DESCRIPTION OF THE PRIOR ART

My copending applications Ser. Nos. 691,762 and 691,870, both filed December 1967, and also my copending application Ser. No. 739,348 filed June 24, 1968 relate to methods and apparatus and employing a mandrel in the production of a flat bottom package on form, fill and seal packaging machinery. Each of these applications shows a flat plate which is movable against the bottom of the package to assist in forming the flat bottom. While this procedure has proved quite satisfactory, there exists a continuing need for new and improved procedures for forming the flat bottom of the package.

SUMMARY OF THE INVENTION

The purpose of this invention is to provide a new and improved method and apparatus for producing a flat bottom on a package with the type of form, fill and seal machinery having a movable mandrel.

According to the present invention the upper surface of the sealing jaws are employed as a platen which cooperates with the bottom of the mandrel to flatten the bottom of the package.

In carrying out the invention, after a transverse seal is formed across the tubular length of material and the completed package is severed, the jaws are separated very slightly, for example just enough to relieve the pressure of the jaws against the material. The mandrel, which has been moving downwardly heretofore now moves all the way down to and against the upper surface of the sealing jaws. During this last phase of movement, as the mandrel approaches the inside bottom of the package, the bottom transverse seal will swing upwardly against the flat bottom being formed. Thus, when the mandrel actually reaches the upper surface of the sealing jaws, the bottom transverse seal is folded neatly in a horizontal position between the bottom of the package and the upper surface of the sealing jaws.

The present invention is applicable to either the arrangement shown in my application Ser. No. 691,762 having a movable mandrel and stationary sealing jaws (that is, stationary against vertical movement), the arrangement shown in my application Ser. No. 691,870 having a movable former and stationary sealing jaws (but wherein the mandrel is constructed to undergo slight vertical movement) or the arrangement shown in my said application filed June 24, 1968 having a movable mandrel and vertically movable sealing jaws.

Application Ser. No. 691,762 is specifically incorporated by reference herein for its description of the method and apparatus having a movable mandrel and stationary sealing jaws. This arrangement would be modified in the following manner to incorporate the features of the present invention. After the sealing jaws had moved towards each other to form the transverse seal and after the finished package had been severed, the jaws would separate very slightly, for example just enough to relieve the pressure on the package. The mandrel, which has been moving downwardly heretofore, now completes its downward movement against the flat platen upper surface of the sealing jaws to form the flat bottom in the manner described above. Product may enter the package at any convenient time such that it reaches the bottom of the package as soon as the flat bottom is formed. The jaws are then separated and the mandrel moves downwardly between the sealing jaws to form an additional length of tubular material, after which the mandrel is raised to its highest position above the sealing jaws and a new transverse seal is formed across the tubular length of material.

My copending application Ser. No. 739,348, filed June 24, 1968 is specifically incorporated by reference herein for its description of the method and apparatus having a movable mandrel and vertically movable sealing jaw. This arrangement would be modified in the following manner to incorporate the features of the present invention. After the sealing jaws had moved downwardly to form an additional length of tubular material, and after the transverse seal had been formed and the completed package had been severed, the jaws would separate very slightly, for example just enough to relieve the pressure on the package. The mandrel, which had been moving downwardly heretofore, now completes its downward movement against the flat platen upper surface of the sealing jaws to form the flat bottom in the manner outlined above. Product may enter the package at any convenient time such that it reaches the bottom of the package as soon as the flat bottom is formed. The jaws are then separated and they move upwardly into position to move in to form the next transverse seal. Meanwhile the mandrel also moves upwardly to its highest position.

My copending application Ser. No. 691,870, filed Dec. 19, 1967, is also specifically incorporated by reference herein for its description of a method and an apparatus wherein an additional length of tubular material is formed by moving the former upwardly while the sealing jaws engage the tubular length of material to prevent upward movement thereof. This arrangement would be modified in the following manner to incorporate the features of the present invention. First, the mandrel would be constructed to undergo slight vertical movement in the manner and for the purpose described below. After the former had moved up to form an additional length of material and after the transverse seal had been formed and the completed package had been severed, the jaws would separate slightly, for example just enough to relieve the pressure on the package. The mandrel would then move down from its raised position pressing the bottom of the tubular length of material against the flat platen upper surface of the sealing jaws to form the flat bottom in the manner outlined above. Product may enter the package at any convenient time such that it reaches the bottom of the package as soon as the flat bottom has been formed. The mandrel then moves up and out of engagement with the bottom of the tubular length of material. The jaws are then separated and the former is moved down carrying the lowermost portion of the tubular length to a level below the level of the sealing jaws. The jaws then move in to form another transverse seal and the cycle is repeated.

Thus, it is an object of this invention to provide a new and improved method and apparatus for packaging.

It is another object of this invention to provide a new and improved method and apparatus for forming a flat bottom on a package formed on a form, fill and seal packaging machine.

It is still another object of this invention to provide a new and improved method and apparatus for the formation of a flat bottom package on a form, fill and seal packaging machine of the type having a movable mandrel and vertically movable sealing jaws.

It is still another object of this invention to provide a new and improved method and apparatus for the formation of a flat bottom package on a form, fill and seal packaging machine of the type having vertically stationary sealing jaws.

Other objects and the attendant advantages of the present invention will become apparent from the detailed description to follow together with the accompanying drawings.

BRIEF DESCRIPTION OF THE DRAWINGS

There follows a detailed description of a preferred embodiment of the present invention showing the features of the invention as incorporated in an arrangement having a movable mandrel and movable sealing jaws, together with the accompanying drawings. However, it is to be understood that the invention is capable of numerous modifications and variations apparent to those skilled in the art without departing from the spirit and scope of the invention.

In the drawings:

FIGS. 1 through 6, inclusive, are diagrammatic drawings showing the sequence of operation of the present invention in connection with the formation of a package and the packaging of a product.

FIG. 1A is a sectional view taken along line 1A—1A of FIG. 1.

DETAILED DESCRIPTION OF THE PREFERRED EMBODIMENT

In the accompanying drawings like numerals are employed to designate like parts throughout.

Referring to FIG. 1, a flat, continuous web of packaging material 10 passes over a guide roll 11 and hence over a former 12 where a sealing member 13 connects the opposite edges of the web to form a longitudinal seal and forms the web into a continuous tubular length of packaging material 14. The former 12 may be of the type shown in FIGS. 13 and 14 of the Leasure Pat. No. 2,969,627.

A pair of sealing jaws 15a and 15b are provided for forming a transverse seal across the tubular length 14 and pulling the material over the former. These sealing jaws further include a cooperating knife and slot means 16a and 16b of a construction well known in the art, for severing a completed package after the seal has been formed. The upper surfaces of these sealing jaws are flat so as to form a platen surface 40 with which a movable mandrel 20 cooperates to form a flat bottom in a manner to be described in greater detail below. These sealing jaws are movable along paths 17a and 17b, respectively, as shown in dotted lines. The jaws come together at an upper level to form a transverse seal, and move downwardly, while still engaged, to pull additional material over the stationary former 12 to form an additional length of tubular material. The jaws then separate very slightly to release a severed completed package and to relieve the pressure against the package. At this point the mandrel 20 is moved against the upper surface of jaws 15a and 15b to form the flat bottom. The jaws then separate completely and rise to their upper positions to commence a new cycle.

The said mandrel 20 is hollow and has an upper end with a funnel 21 formed thereon for receiving a product and a lower end 19. The upper end portion of the mandrel 20 adjacent the funnel 21 and extending through the former is of a shape so that it passes through the former with clearance so that the former does not interfere with the reciprocatory movement of the mandrel. The lower end portion 19 of the mandrel is generally rectangular and of a shape to give the package the desired configuration. The sides of the end portion 19 could include a pair of V-shaped indentations to form gussets in the tubular shaped packaging film.

The mandrel cross-section may be of shapes dependent upon the desired configuration of the finished package. The peripheral distance around the mandrel is the same as the width of the packaging film less the width of film used in making the longitudinal seal. For example, if one desired a round flat bottom, then one would employ a round mandrel. However, in a preferred embodiment of the invention the mandrel will have a generally rectangular cross-section with two opposing sides having a slightly indented V-shaped groove for cooperating with gusseting bars 33 in a manner to be described in greater detail below, for forming a gussetted package.

For providing vertical reciprocation of the mandrel there is provided a collar 22 fixed to the mandrel and connected to a connecting rod 23 by a pin and slot connection 24, the rod 23 being connected to a stationary pivot 25. Connecting link 26 is pivotally connected at one of its ends to the rod and its other end to a lever 27 which is in turn pivotally connected to a stationary pivot 31. This lever 27 includes a cam follower 28 affixed thereto which follower is received in an eccentric groove 29 in a cam plate 30. Thus, rotating movement of the cam plate 30 causes reciprocating movement of the mandrel 20.

The operation of the invention is as follows. In FIG. 1 jaws 15a and 15b have moved towards each other along the upper parts of paths 17a and 17b to form a transverse seal which is the upper seal of package A and the lower seal of package B. The jaws 15a and 15b now move downwardly to the position shown in FIG. 2, pulling the length of tubular material with it and thereby pulling an additional length of material over the former 12. The mandrel 20 could move downwardly as the jaws move downwardly; for example to the position shown in FIG. 2. Knife and slot means 16a and 16b then sever package A from the bottom of the next package, i.e., package B, and the jaws separate very slightly, e.g., just enough to release the completed package A and relieve the pressure against the newly formed transverse seal 32. At this point the mandrel 20 now moves down until its lower end 19 presses the bottom of the package against the upper platen surface 40 of sealing jaws 15a and 15b. As shown in FIG. 3 during the last phase of downward movement of the mandrel 20, i.e., as the bottom begins to flatten, there is a natural tendency for the lower transverse seal 32 to rise out of the space between the sealing jaws 15a and 15b and swing up to a generally horizontal position flat against the partially formed flat bottom. At the time when the mandrel completes its downward movement, the transverse seal is folded neatly between the mandrel and the platen surface 40. The flat bottom of package B is now formed.

As shown in the drawings, product P may be introduced into the package at such time that it reaches the bottom of the length of tubular material as soon as this lower-end has been flattened.

If desired, suitable means may be provided for applying an adhesive to the lower transverse seal 32 before it reaches the platen surface 40 so that engagement with the platen 40 will cause the transverse seal 32 to adhere to the flat bottom of the tubular length 14 thereby forming the flat bottom of package B. For certain types of packaging material it may be desirable to heat the platen and to utilize a heat sealable coating on the packaging material.

The mandrel is then moved upwardly as shown in FIGS. 5 and 6, and the sealing jaws 15a and 15b complete their separation, rise upwardly along the outer portions of paths 17a and 17b as shown in FIG. 5 and then move inwardly to form the transverse seal which forms the top of package B and the bottom of package C. Of course if desired, the sealing jaws may move above the upper part of paths 17a and 17b, and then inwardly at the higher level, and then downwardly to the position shown in FIG. 6 whereat the seal is to be formed. The purpose of this is to strip the seal area clean of product before forming the seal, this stripping operation being more fully described in my prior Pat. 3,027,695.

The method and apparatus of the present invention may be employed in the production of either a pillow type package or a gussetted type package. In the production of a pillow type package the two ends of the lower seal would project laterally after the said lower seal has been folded up to the package. Suitable means (not shown) may be employed for folding these ends up to and attaching them against the sides of the package. Alternatively, means (not shown) may be employed for folding these ends under the package before the package engages the platen surface 40.

To form a gussetted type package gussetting bars 33 would engage the packaging film on the outer surface with the mandrel on the inner surface to urge the sides of the tubular length 14 into grooves 18 in the mandrel. If desired, rollers or other suitable means may be applied to the outer surface of the packaging film at the corners of the mandrel to crease the film more precisely and give the package a more tailored appearance.

Sealing jaws 15a and 15b then form the transverse seal closing the package and permanently forming the gussets with the longitudinal seal formed therein. One advantage of this arrangement is that the longitudinal seal is on the side of the package, leaving the front and back free for the advertising message. The arrangement of the grooves 18 and the gusset bars 33 are shown in greater detail in FIG. 1A.

The arrangement shown in the figures may also be varied by changing the circumferential orientation of the former and/or the sealing jaws. For example, when forming a gussetted package with the longitudinal seal in the gusset, the sealing jaws 15a and 15b must be used in the positions shown to form the gussets. However, the former 12 and the longitudinal sealing means 13 could be turned 90° to place the longitudinal seal on the front or back of the package rather than in the gusset. Further, when producing a pillow type package with a mandrel which does not include the grooves 18, the sealing jaws may be employed in the positions shown to place the longitudinal seal on the side, or the sealing jaws may be turned 90° about the axis of the tubular length 14, to place the longitudinal seal on the front or back of the package.

Although preferred embodiments of the invention have been illustrated and described in considerable detail, it should be understood that the invention is capable of numerous modifications and variations apparent to those skilled in the art without departing from the spirit and scope of the invention as defined in the claims.

I claim:

1. A method of packaging in which a former is adapted to shape a continuous web of material into a substantially tubular length of material comprising the steps of: forming an end seal across the tubular length of material by engaging the tubular length of material with opposing sealing jaws, the surface of the sealing jaws facing the former being sufficiently flat to form a platen surface; relieving the pressure of the jaws against the tubular length of material by slightly separating the sealing jaws; and subsequently flattening the end of the tubular length of material remote from the former by (a) moving a mandrel against the inside of said end of the tubular length of material to expand the said end and concurrently cause the end seal to move out from between the sealing jaws and (b) concurrently pressing both the expanded end and the said end seal against the said platen surface of the sealing jaws to form the flat bottom; and then further separating the sealing jaws from each other by an amount sufficient to permit the tubular length of material to pass between the sealing jaws.

2. The method of claim 1 wherein the mandrel is a hollow tube passing through the former and having an outer cross-sectional area slightly less than the cross-sectional area of the tubular length of material, and wherein the step of moving the mandrel is accomplished by means engaging the mandrel at a point on the side of the former opposite from the said remote end of the tubular material.

3. The method of claim 1 including the step of forming gussets in the opposite sides of the tubular length of material before forming the said end seal thereacross.

4. The method of claim 1 including the step of forming an additional length of tubular material by pulling the material over the former after the said flattening steps.

5. The method of claim 1 wherein the sealing jaws are movable through a cycle into engagement with the tubular length of material linearly with the tubular length of material, and upwardly for commencing a new cycle, and wherein said engaging, moving, and separating steps include moving the sealing jaws through said cycle into engagement with the tubular length of material, vertically with the tubular length of material, and away from the tubular length of material.

6. The method of claim 5 wherein the step of slightly separating the sealing jaws and flattening the end of the tubular length of material is carried out immediately after the said vertical movement of the sealing jaws.

7. The method of claim 1 wherein the sealing jaws are stationary against vertical movement towards and away from the former, and wherein the mandrel is movable between the sealing jaws between a high point closer to the former than the sealing jaws and a low point on the side of the sealing jaws away from the former and wherein said method includes the step of moving the mandrel against the inside of the tubular length of material to form an additional length of tubular material.

8. The method of claim 7 wherein the step of slightly separating the sealing jaws and flattening the end of the tubular length of material is carried out immediately after the step of forming the end seal across the tubular length of material.

9. A packaging apparatus including a former means for forming a continuous web of sheet material into a tubular length of material, opposing sealing jaws for engaging the tubular length of material to form package closing end seals across an end of the tubular length of material remote from the former and means for advancing the web over the former to form an additional length of tubular material; the improvement comprising a flattening means for expanding and flattening the said remote end of the tubular length of material in the vicinity of the said end seal, said flattening means comprising a mandrel movable against the inside end of the tubular length of material remote from the former to expand the lower end of the tubular length of material and concurrently cause the end seal formed by the sealing jaws at the lower end to fold up towards the lower end, and the surface of the sealing jaws facing the former being of sufficient size and being sufficiently flat to form a platen surface, and said mandrel being further movable against the platen surface to press both the end of the tubular length of material and the said end seal between the mandrel and the platen surface to form the said flattened end.

10. The apparatus of claim 9 wherein the said mandrel is mounted for movement through the former means and through the interior of the tubular length of material against the inside remote end.

11. The apparatus of claim 10 wherein said mandrel is a hollow tube, the said end of which has a cross-sectional area slightly less than cross-sectional area of tubular length of material.

12. The apparatus of claim 10 including means engaging the mandrel at a point on the side of the former away from said tubular length of material for moving the mandrel.

13. The apparatus of claim 9 including means for moving said sealing jaws through a cycle of operation into engagement with the tubular length of material, linearly with the tubular length of material and away from the tubular length of material, and means for moving the mandrel against the said platen surface immediately after the said linear movement of the sealing jaws.

14. The apparatus of claim 9 wherein said sealing jaws are mounted for reciprocating movement towards and away from said tubular length of material but are prevented from moving in the direction of movement of the tubular length of material, and including means for moving the mandrel between the sealing jaws to the side thereof away from the former, and the means for moving the mandrel against the platen surface immediately after the sealing jaws move towards the tubular length of material to form the closing seals.

References Cited

UNITED STATES PATENTS

| | | | |
|---|---|---|---|
| 3,086,335 | 4/1963 | Frank | 53—180 |
| 3,263,391 | 8/1966 | Wallsten | 53—28 |

TRAVIS S. McGEHEE, Primary Examiner

E. F. DESMOND, Assistant Examiner

U.S. Cl. X.R.

53—180